United States Patent [19]

Blankenship

[11] Patent Number: 5,349,157

[45] Date of Patent: Sep. 20, 1994

[54] INVERTER POWER SUPPLY FOR WELDING

[75] Inventor: George D. Blankenship, Chardon, Ohio

[73] Assignee: The Lincoln Electric Company, Cleveland, Ohio

[21] Appl. No.: 132

[22] Filed: Jan. 4, 1993

[51] Int. Cl.⁵ .............................................. B23K 9/10
[52] U.S. Cl. .............................. 219/130.32; 323/258; 363/26; 363/86
[58] Field of Search ........... 219/130.1, 130.21, 130.31, 219/130.32, 130.33, 137 PS, 130.4; 323/258, 263; 363/24, 25, 26, 85, 86, 128, 129

[56] References Cited

U.S. PATENT DOCUMENTS

| | | | |
|---|---|---|---|
| 2,777,973 | 1/1957 | Steele et al. | 219/130.4 |
| 3,231,751 | 1/1966 | Bates | 307/52 |
| 3,356,928 | 12/1967 | Parrish | 321/18 |
| 4,459,459 | 7/1984 | Overman | 219/130.32 |
| 4,503,316 | 3/1985 | Murase et al. | 219/130.32 |
| 4,521,671 | 6/1985 | Fronius | 219/130.31 |
| 4,736,284 | 4/1988 | Yamagishi et al. | 363/16 |
| 4,897,522 | 1/1990 | Bilczo et al. | 219/130.32 |
| 5,272,313 | 12/1993 | Karino et al. | 219/130.21 |

Primary Examiner—Clifford C. Shaw
Attorney, Agent, or Firm—Vickers, Daniels & Young

[57] ABSTRACT

A high frequency power supply for supplying a yielding current through a choke to a welding station including an electrode element and a workpiece element, wherein the power supply includes a transformer means for creating a first current pulse in a first secondary winding and a second current pulse in a second secondary winding and means for connecting said secondary windings to pass said current pulses through said choke and across said elements. The transformer means including a first transformer with a first core and means for receiving on the first core the first secondary winding with the first core being magnetized in a first primary flux direction upon creation of the first input pulse, a second transformer with a second core and means for receiving on the second core the second secondary winding with the second core being magnetized in a second primary flux direction upon creation of the second input pulse and core reset means for magnetizing one of the cores in the flux direction opposite to the primary flux direction when said other core is magnetized in its primary direction.

28 Claims, 1 Drawing Sheet

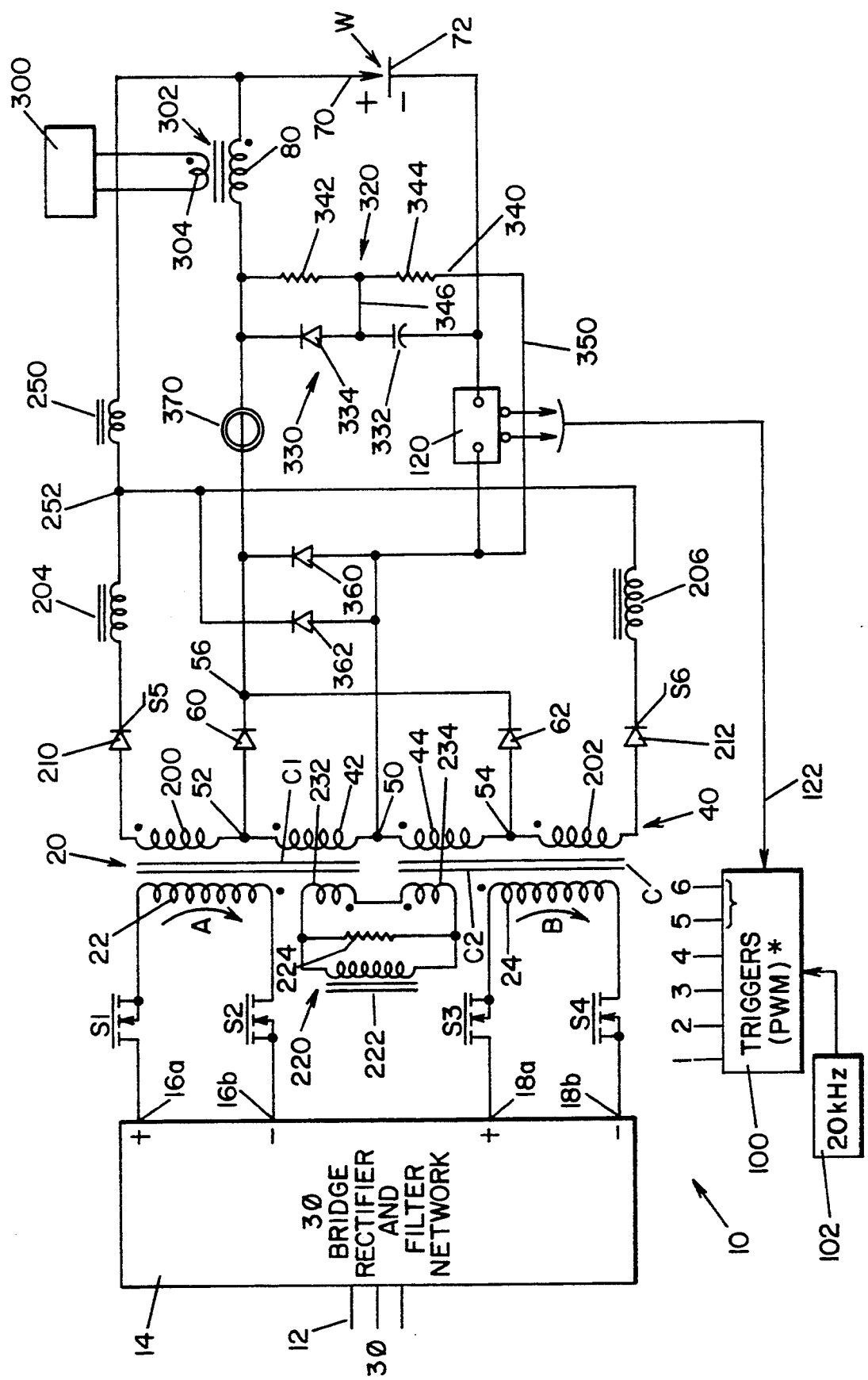

INVERTER POWER SUPPLY FOR WELDING

The present invention relates to the art of high frequency inverters of the type used as power supplies for arc welding operations and more particularly to an improved high frequency power supply to supplying a welding current through a choke to a welding station, including an electrode element and a workpiece element.

INCORPORATION BY REFERENCE

Bilczo U.S. Pat. No. 4,897,522 is incorporated by reference herein to illustrate the type of power supply to which the present invention is directed. This prior patent makes it unnecessary to repeat the background information contained therein to explain details of the background of the present invention.

BACKGROUND

This invention is particularly applicable for high frequency inverter used for DC welding, wherein a rectified D.C. power supply is ultimately switched to produce alternate polarity output pulses in the secondary of a transformer means, wherein the output pulses are rectified and directed across the electrode element and workpiece of the welding station for the purposes of performing a welding operation. The present invention is described with reference to this use of an inverter; however, the invention has broader applications and may be used with various high frequency inverters of the type creating a series of current pulses which create current directed across the electrode and workpiece of a welding station for the purposes of performing a welding operation. In accordance with the preferred application of the invention, the switching operation is accomplished by two separately and alternately operated switch means, such as FET's, wherein one switch means is activated to magnetize the core of the transformer means and the other switching means is employed for creating a separate opposite polarity current pulse at the secondary of the transformer means. By alternating switching the operation of the two switch means, high frequency alternating current is magnetically coupled into two secondary windings. This high frequency current in the form of pulses is directed by rectifying means, such as high speed diodes, through electrical filtering means, such as an inductor or choke, to the output terminals of the D.C. welder.

The secondary stage of the output transformer means for an inverter, of the type to which the present invention is particularly directed, has two secondary windings in which are created current pulses that are separately rectified. When the output of the transformer means is driven by a first secondary winding, there is a pulse of current created in a first electrical polarity in the power supply. A pulse of the opposite electrical polarity is then created in the second secondary winding at the output of the transformer means of the power supply. These opposite polarity current pulses are directed through the high speed diodes to the welding station. High frequency electrical current pulses of proper polarity are thus directed toward the inductor or choke of the welder, through the inductor or choke to the output terminals of the D.C. welder.

The first and second switch means for creating the first and second current pulses are controlled by electrical trigger or gate pulses of a selected pulse time or pulse width and repetition rate. To control the magnitude of the welder output current or voltage, the width, or spacing, of the trigger pulses is varied to vary the output current across the electrode and workpiece of the welding station or installation. As more current or voltage is required for the welding operation, the width of the pulses for energizing the primary of the transformer means is increased proportion to the desired increase in the output current. The current is normally controlled by a feedback circuit for the inverter by use of a voltage control pulse width modulator circuit operated at a selected frequency, such as 20 KHz. These modulators are commonly used in electrical switch mode inverter power supplies and are available in the form of standard integrated circuit packages familiar to those skilled in the art. The selected frequency of operation affects the response time of the welder to the feedback current signal or senses voltage signal and, thus, affects the ability of the welder to respond to small changes in the welding arc. A high frequency, above approximately 10 KHz, is necessary to provide substantial improvement in performance. The frequency of operation also affects the audibility of the arc and the welding circuitry. To minimize objectionable noise and improve operator appeal a frequency above approximately 20 KHz is normally chosen.

In accordance with the invention of Bilczo U.S. Pat. No. 4,897,522, the high frequency inverter to which the present invention is particularly directed, is modified by the inclusion of a booster winding on the output of the power transformer for providing additional voltage to extend the operating current range of the inverter. The input or primary windings for the power transformer tend to saturate the core of the tightly coupled transformer design where pulses in one direction have a different time duration than pulses in the other electrical direction. By having different current flows through the transformer, the D.C. component is created in the core causing the large D.C. current to flow. This current flow results in a large ampere-turn product and forces the D.C. flux in the transformer to increase for saturation of the transformer core. Consequently, the novel design in Bilczo, although highly advantageous over known structures, still presented a problem in obtaining appropriate utilization of the ferrite core material of the transformer and the complexity of the winding procedure. Further, the prior power supply was somewhat unstable at lower welding currents and presented some difficulties with respect to starting of the welding operation.

THE INVENTION

Disadvantages experienced in high frequency inverter type power supplies of the type defined above have been overcome by the present invention which relates to an improvement in a high frequency inverter type power supply including a transformer means for creating a first current pulse in a first secondary winding and a second current pulse in a secondary winding and means for connecting the secondary windings to pass the two opposite polarity pulses through the choke and across the elements forming the welding station. The improvement of the present invention is to construct the transformer means into a first transformer having a first core and means for receiving, on the first core, the first secondary winding of the power supply with the first core being magnetized in a first flux direction upon creation of the first pulse and a second transformer with a separate and distinct second core and means for receiving, on the second core, the second secondary winding of the power supply with the second core being magnetized in a second direction upon creation of the second pulse. This improvement of using two transformers is also improved further by including a core reset means for magnetizing the second core in the flux direction opposite to the second direction when the first core is magnetized in the first direction. In a like manner, this core reset means further includes means for magnetizing the first core in the flux direction opposite to the first direction when the second core is magnetized in the second direction.

By providing a separate core for the transformer means of the power supply, two separate and distinct primaries wound on separate cores. These windings are separated so that they are not mutually coupled, except by the reset means which is in the form of two reset windings, one on the first core and the second on the second core. These reset windings are connected in a series circuit so that current induced by the first core will be applied to the second core as a reset pulse, and vice versa. The polarity of the induced current flow from one core to the next resets or magnetizes the core preparatory to the application of a primary pulse by one of the two separate and distinct primary windings forming transformer means of the high frequency inverter type power supply. Consequently, the present invention relates to an improvement in the output circuit for an inverter type power supply wherein the first and second opposite polarity pulses can induce opposite polarity pulses in secondary windings associated with separate cores with the reset windings thereby resetting one core preparatory to the next application of a current pulse by the inverter to the primary winding of the other transformer.

In accordance with another aspect of the present invention, the output stage of the inverter type power supply includes an auxiliary current boosting winding connected to and in series with one of the secondary windings in a current control means for connecting the auxiliary winding to one of the welding station elements such as the electrode and workpiece with a current control circuit including a unidirectional device poled in the same direction as the first pulse from the power supply and a current limiting element in series with the unidirectional device. By this arrangement, an additional voltage is created across the arc at lower welding currents.

Yet another aspect of the present invention is the provision of an energy storing means associated with the auxiliary winding in the output stage of the high frequency inverter so that the higher voltages created at lower welding currents can cause a storage of energy for creating a background current driven by an auxiliary winding. Consequently, a minimum current is maintained across the arc. The energy storing means, is an inductor which has a substantially higher inductance than the choke between the main power output of the transformer means and the welding station or installation. In this manner, the main welding choke can have a a relatively low inductance allowing fast response from the power supply. The higher inductance in the auxiliary winding portion of the output transformer means creates a minimum current through the welding circuit. This background current need not be changed rapidly by requirements of higher or lower current flow. In this manner, a rapid response time is provided with a small choke or inductance in the output circuit of the power supply, while the power supply itself incorporates a large choke in the auxiliary winding portion to maintain a minimum background current for the welding operation.

Still a further aspect of the invention involves the use of the output choke of the power supply as the secondary of a transformer driven by a high frequency starting generator in the output circuit. A unidirectional circuit, including a capacitor in series with the welding station elements and a current limiting inductor means between the secondary windings and the unidirectional circuit is used to maintain the current flow in the unidirectional circuit during operation of the starting transformer. Consequently, high frequency, high voltage pulses employed for starting of the: arc, either at the start of a cycle or during the cycle, are concentrated in the output circuit of the power supply and do not affect the current sensing accuracy of the power supply.

The primary object of the present invention is the provision of an output circuit for high frequency inverter type power supply used for welding and having two alternate frequency primary windings, which circuit prevents saturation of the output transformer means, stabilizes the welding arc, allows high frequency starting of the arc without adversely affecting the power supply and stabilizes the power supply during open circuit voltage conditions.

A further object of the present invention is the provision of an output circuit to create an improved high frequency inverter type power supply for welding, which output circuit is inexpensive to operate, allows a rapid response to changes in conditions and is particularly applicable for preprogrammed complex operation of a welding cycle.

Another object of the present invention is the provision of an output circuit for a high frequency inverter type power supply for welding, as defined above, which output circuit improves certain characteristics of prior transformer arrangements to direct the output of an inverter to a welding station.

BRIEF DESCRIPTION OF DRAWINGS

The single drawing in this application is a wiring diagram of the preferred embodiment of the invention.

PREFERRED EMBODIMENT

Referring to the drawing wherein the showing is for the purpose of illustrating a preferred embodiment of the invention and not for the purpose of limiting same, a high frequency inverter 10 of the type having a three phase input 12 and a three phase bridge rectifier and filter network 14 to develop a D.C. output illustrated as two separate sets of output terminals 16a, 16b and 18a, 18b. Of course, the output of the rectifier is a single positive and negative terminal. The two sets of output terminals are representative in nature to show power supplied to the output stage, in the form of transformer means 20, by way of first primary winding 22 of a first transformer A and second primary winding 24 of a second transformer B. The transformers cause input current flow in the opposite directions also identified by A and B. In this embodiment one winding is used to magnetize core C1 and a separate winding is used to magnetize the core C2. In some high frequency inverters current in opposite directions is passed through a single winding serving as the primary of the output transformer. Two sets of switching devices S1, S2 and S3, S4 are employed for the purpose of magnetizing core C1 and then magnetizing core C2 of transformer means 20. Switching devices S1–S4 are illustrated as FET's. Actuation of devices S1, S2 causes current to flow in the direction A through the first primary winding 22. In a like manner, closing, or actuation, of the switches or switching devices S3, S4 causes current flow in the direction B through second primary winding 24. In this manner, cores C1, C2 are alternately magnetized by alternate operation of the switching sets. This action causes induced voltage in the winding of the secondary or output stage of inverter 10 comprising a secondary winding 40, shown as divided into separate sections 42, 44. These sections can De individual windings or sections of a single winding, since they are polarized in the same direction. Winding 42 is the secondary of transformer A. In a like manner winding 44 is the secondary of transformer B. A tap at the center winding 40 is a common junction 50. Spaced winding ends 52, 54 constituted the output stage for the inverter before incorporating the invention disclosed in Bilczo U.S. Pat. No. 4,897,522. Rectifying diodes 60, 62 cause a D.C. output between common junction or tap 50 and a common output terminal 56 for receiving current flow from terminals 52, 54. D.C. current between tap 50 and terminal 56 flows through the welding station W, comprising electrode element 70 and workpiece element 72. Pulses of current between junction or tap 50 and terminal 56 are filtered through a standard choke 80, to be explained later, and applied across welding station W.

To synchronize the actuation of the two sets of switchable devices S1–S4, there is provided a standard trigger gating circuit 100 controlled in a pulse width modulation mode and having a sequencing clock 102 operating with a frequency of 20 KHz. Circuit 100 includes output or gates 1–6, with outputs 1–4 adapted to produce actuating signals for switching devices S1–S4, respectively. During the first operating phase, a gate signal or trigger pulse on outputs 1 and 2 actuate switches S3, S2, in unison, causing current flow in the direction A through winding 22 of the first transformer. Thereafter, the actuating gate signals on outputs 1, 2 are removed and gate signals are generated on outputs 3, 4. These signals or trigger pulses actuate switches S3, S4 to cause magnetizing current flow in the direction B through winding 24 of the secondary transformer, as shown in the drawing. The pulses at outputs 1, 2 and then at outputs 3, 4 are generated at a pulse rate of 20 KHz. The width of the pulses is varied to control the output current in the welding station. In a constant current welding mode this is generally accomplished by sensing current flow in the output circuit by a detector, such as shunt 120. The sensed current controls circuit 100 by changing the pulse width in accordance with the voltage on schematically illustrated line 122. As the current decreases, the voltage on line 122 decreases and the width of the trigger pulses for FET S1–S4 increases in accordance with standard pulse width modulation concepts.

The high frequency inverter 10 includes auxiliary voltage boosting secondary windings 200, 202. These windings are connected in series with secondary winding sections 42, 44. In practice, each of these windings is comprised of enough turns to increase the maximum output voltage to about 110 volts. These auxiliary windings are in series with current control circuits including current limiting inductors 204, 206, respectively. Of course, a resistor could be used for current limiting purposes; however, chokes 204, 206 are more efficient than resistors because they generate less heat. Unidirectional devices 210, 212 are coordinated with diodes 60, 62 to rectify the output currents of the auxiliary current windings 200, 202. Unidirectional devices 210, 212 are illustrated as SCRs S5 and S6, respectively. SCRs would provide the capability of selectively implementing the auxiliary current windings 200, 202. By using the auxiliary secondary windings, the current characteristic of these windings is superimposed upon the standard characteristic curve.

In accordance with the present invention, the transformer means 20 is divided into two separate and distinct transformers A, B. Transformer A is associated with the current A direction, primary winding 22 and secondary winding 44. The second transformer B is driven by current flow in direction B and includes primary winding 24 and secondary winding 54. These two distinct transformers are interconnected at their secondaries as previously described. The cores C1 and C2 are different cores and are not inductively coupled. This avoids saturation as was inherent with tightly coupled transformer windings on the same core. In the past, if the pulse timing between current flow in direction A and current flow in direction B is not precise and equal, the tightly coupled transformer design would build up volt-second energy. Since this energy is not equal in the two directions A, B when using a single core, saturation would result. This was due to the fact that the primary windings on the mounted on the same core were low impedance windings. Consequently, small D.C. voltage components caused by the unbalance between current in direction A and current in direction B caused a large D.C. current to flow through the primaries. This high current flow resulted in a very high product of ampere turns and forced substantial D.C. flux into the transformer. Such flux saturated the transformer core caused inefficiencies. Even with the current mode control scheme and precise transformer operation attempted in the past, there was a difficulty experienced with respect to saturation of the core used to produce current pulses of the opposite polarities at the secondary output circuit of the transformer means 20. This difficulty has been overcome by the present invention. Consequently, good utilization of ferrite core material has been obtained with positive prevention of core saturation. To accomplish this objective, the invention uses two cores C1, C2, as previously described with a reset circuit 220 having inductor 222 and resistor 224 in parallel and, in turn, in series with separate reset windings 230, 232. These separate windings were added to core C1, C2, respectively, and were then coupled through the parallel circuit of inductor 222 and resistor 224 as shown in the drawing. When current is flowing through transformer A identified as direction A, a voltage is induced on the reset winding 232. This voltage causes a current to flow through inductor 222 and resistor 224. This reset current flow is conducted through reset winding 234 causing flux in transformer B which is in the opposite direction than that induced when the primary switches S3, S4 are conductive to cause current flow B through primary 24. This action of circuit 222 resets the flux of core C2. Inductor 222 and resistor 224 limit current flow in the event that the core of either transformer A or transformer B become saturated or in the particular instance where other operating conditions cause the voltage in the reset circuit 220 to be other than the induced voltage on one of the opposite reset windings 232, 234. In practice, in a circuit 220 where 12 volt reset windings are employed, inductor 222 is approximately 0.030 mH and resistor 224 is 2 Ohms. The reset circuit 220 assists with better ferrite utilization which lowers the transformer cost by positively preventing saturation and decreases the winding complexity. Reset circuit 220 resets one core C1, C2 when the other core is receiving current from its primary winding. This modification of the output winding for a two stage inverter has proven highly successful in practice.

In accordance with another aspect of the present invention, the combined output of the boost circuits, including windings 200, 202 is provided with a large inductor 250 between common junction 252 and welding station W. Choke or inductor 250 is a steel core choke with a relatively large inductance, such as 15 mH. This large inductance regulates the background current for the welding operation in a smooth manner. Consequently, power supply or inverter 10 is capable of very high speed modulation of the welding current, while maintaining a substantially constant minimum background current caused by energy from the boost windings 200, 202. These windings maintain energy stored in large inductor 250. To allow high speed operation, which is a distinct advantage of the present invention, the inductance in the main welding circuit is extremely low. This low inductance in the main welding circuit has the disadvantage of increasing the propensity for the welding circuit to be shifted into discontinuous conduction at low currents or low voltages. To obtain the necessary advantage of a fast response time and essentially instantaneous shifting of the current flow across the work station, a low inductance is required for the secondary portion of transformer means 20 as fed through the primary power sources diodes 60, 62. Inductor 250 maintains a minimum background current which is essentially greater than about 25 amperes, and preferably about 35 amperes. The problem of discontinuous conduction in the welding operation is especially predominant when the arc plasma being regulated is at low current, such as during the background time of a pulse arc or short circuit welding process. The large inductive reactance of inductor 250 allows current flow to be maintained even when the main welding circuit is not conducting current to the welding operation.

Reactors 80, 250 in practice are sized such that the background current from the circuit including inductor 250 maintains approximately 35 amperes in a 25 volt static load. As the load voltage increases, the background current decreases. In a like manner, as the load voltage decreases, the background current rises. In all cases, modulation of the primary switches S1, S4 will control the current level; however, the split of current between the main welding circuit of diode 60, 62 and the background current through inductor or choke 250 is dependent upon load voltage and is not controllable, with the exception of choosing the relative reactor impedance values. As previously described, the unidirectional devices 210, 212 are preferred; however, these devices could be SCRs which would allow controlled deactivation of the current provided by boost windings 200, 202 for discontinuing the background current when desired.

As shown in the drawing, the output circuit for inverter 10 includes a high frequency, high voltage generator 300 for the purposes of starting the arc between electrode element 70 and workpiece element 72 of work station W. In accordance with another aspect of the invention, the output of generator 300 includes a transformer 302 having a primary 304 for causing current flow in high frequency pulses at secondary 80 which is the also output choke for inverter 10. Thus, transformer 302 serves the dual purpose of inducing a high frequency, high voltage starting pulse into the output circuit as well as creating a relatively small output inductance for the inverter. At high currents, winding or secondary 80 induces an inductance of approximately 15 micro-henry into the output circuit. At least a small amount of inductance is necessary to stabilize the output welding current. When no welding current is flowing, a high voltage, high frequency pulse may be induced into the welding circuit by way of generator 300 and transformer 302. This high voltage, high frequency pulse may be created by spark gap discharge and is used to start the welding operation, such as TIG welding pulse. Capacitor 332 and diode 334 in branch 330 conduct the current induced during the high voltage, high frequency starting pulse in a bypass path so that the inverter circuitry is unaffected by the starting pulse. During starting, the positive sensed current flows from the dot on winding 80, through the arc, through capacitor 332, diode 334 and back to winding 80. In addition, some current flows through resistors 342, 344 of branch 340. It would be normally possible for this starting current to flow through diode 360; however, this is not desired because that diode is a large power diode and may be damaged by the high frequency, high voltage starting pulse. An inductor 370 is also provided between diode 360 and winding 80 to effectively block the high frequency, high voltage current pulse from the output power diode. In practice, inductor 370 is extremely small and is constructed as a small ferrite ring positioned around the lead extending from diode 60 to winding or choke 80.

The circulating current during creation of the starting pulse includes a parallel control circuit 320 including a first branch 330 with capacitor 332 and diode 334 and a second branch 340 with resistor 342, 344. Line 346 connects the two parallel branches at their intermediate stages to allow charging of capacitor 332 through resistor 342 and discharging of the capacitor through resistor 344. The resistors are connected to the opposite side of the choke 120 by line 350. To prevent flow through choke 120, line 350 bypasses the shunt. Capacitor 332 is connected to the output side of the shunt. At low loads on the output of the welder, resistor 342 may conduct current that is a significant part of the total welding current. To improve accuracy, this current through resistor 342 does not flow through shunt 120. It is not desired to measure the starting pulse current and other noise currents that flow in the output cables and through capacitor 332 during the welding operation. Consequently, capacitor 332 is connected on the opposite side of shunt 120. There is a current that is conducted by capacitor 332 as the inverter sections commutate. This current is introduced into the measuring circuit but the current is synchronized with the inverter operation and is an A.C. signal which can be discriminated by the D.C. current responsive integrated circuitry that is used to measure the shunt signal. Consequently, even slight current flow through capacitor 332 is eliminated from feedback through shunt 120.

Resistors 342, 344, in combination with capacitor 332 and diode 334, serve to stabilize the inverter during high voltage, low current load conditions. The series combination of resistors 342, 344 provide a maximum resistance that will be a minimum load for inverter 10. Consequently, branch 340 serves to stabilize the control loop of the inverter. The resistors 342, 344 are approximately 45 ohms resistance. This reduces the range of operation of power supply 10 to 0.1 milli-ohms to 45 ohms. This is substantially less than the range without a minimum load created by the resistors. In addition, capacitor 332 charges to a voltage determined by the average voltage present at the input of transformer 302 and the combination of resistors 342, 344. Since inductor 250 is relatively large, capacitor 332 charges to the average value of the boost voltage. However capacitor 332 charges quickly to a peak voltage found at the output of the main welding rectifiers 60, 62. Resistor 342 is provided to limit the charging current of capacitor 332 as delivered from the main welding circuit. When an arc is struck, capacitor 332 may discharge through diode 334 and resistor 344. The discharge current is limited by the inductance of the choke 80. Consequently, diode 334 is provided for controlling the high frequency starting operation, but must be rated to accommodate the discharge current of capacitor 332.

As an additional function, capacitor 332 and resistor 342 form a filter to remove high frequency parasitic harmonics from the voltage waveform during operation of the power supply. Since the welding cables are highly inductive, winding 80 is an inductor and there is also parasitic inductance in the machine cables between the main transformers A, B and the input to choke 80. Consequently, there can be substantial voltage excursions induced in the welding circuit due to voltage division in the inductors under a condition where the current is to be changed rapidly. Resistor 342 and capacitor 332 form a filter to smooth this voltage and protect diodes 60, 62 and 334 from excessive reverse voltage transients. Additionally, the amount of noise induced in the control circuit is reduced by this filtering concept.

Diodes 360, 362 are employed to freewheel the current when the FET switches on both inverter halves are in the non-conductive condition. At this time, both output diodes 60, 62 are reverse biased. Diode 360 freewheels the main welding current and diode 362 freewheels the background current through inductor or choke 250. Diodes 360, 362 are not essential to the operation of the power supply. Even though the transformers are loosely coupled through reset circuit 220, the output current may be allowed to freewheel through the transformer cores and the transformer cores will reset because the voltage on the transformers reverses. The free-wheeling energy is coupled to the primary filter capacitors through the clamping diodes which are not shown. The instance that can occur in the transformers is that the transformer cores can actually saturate in a direction opposite to that in which they are magnetized by the primary current flow. This is not a major problem and can be accommodated by larger transformer material. The freewheeling diodes are provided to improve the power efficiency of the power supply. Energy losses are reduced when the current is freewheeled through diodes than when it is freewheeled back through the transformers and coupled back into the primary side of the power supply through the clamping diodes. practice, diode 360 is employed and diode 362 is not employed. At higher levels of background current, diode 362 would be incorporated into the circuit, as illustrated in the drawing. When diodes 360, 362 are not used in the circuit, current is freewheeled back through the transformers and the output current can be reduced very quickly. Thus, in very high speed operation, the freewheeling diodes are not employed in the present invention.

Having thus defined the invention, the following is claimed:

1. In a high frequency power supply for supplying a welding current through a choke to a welding station including an electrode element and a workpiece element, said power supply including a transformer means for creating a first current pulse in a first secondary winding and a second current pulse in a second secondary winding and means for connecting said secondary windings to pass said current pulses through said choke and across said elements, the improvement comprising: said transformer means including a first transformer with a first core and means for receiving on said first core said first secondary winding with said first core being magnetized in a first flux direction upon creation of said first pulse, a second transformer with a second core: and means for receiving on said second core said second secondary winding with said second core being magnetized in a second flux direction upon creation of said second pulse and core reset means for magnetizing said second core in the flux direction opposite to said second direction when said first core is magnetized in said first direction.

2. The improvement as defined in claim 1 wherein said core reset means further includes means for magnetizing said first core in the flux direction opposite to said first direction when said second core is magnetized in said second direction.

3. The improvement as defined in claim 2 wherein said reset means includes a reset circuit including a first reset winding on said first core and a second reset winding on said second core and in series with said first reset winding.

4. The improvement as defined in claim 3 wherein said reset circuit includes means for limiting current flow through said reset windings.

5. The improvement as defined in claim 2 including an auxiliary current boosting winding connected to and in series with said first secondary winding and a current control circuit means for connecting said auxiliary winding to one of said welding station elements with said current control circuit means including an unidirectional device poled in the same direction as said first pulse and a current limiting element in series with said unidirectional device.

6. The improvement as defined in claim 5 wherein said current limiting element is an inductor.

7. The improvement as defined in claim 5 including a background inductor in series with said current control circuit of said current boosting winding.

8. The improvement as defined in claim 7 including a second auxiliary current boosting winding connected to and in series with said second secondary winding and a second current control circuit means for connecting said second auxiliary winding to said one station element at a position between said first mentioned control circuit and said background inductor.

9. The improvement as defined in claim 1 wherein said reset means includes a reset circuit including a first reset winding on said first core and a second reset winding on said second core and in series with said first reset winding.

10. The improvement as defined in claim 9 wherein said reset circuit includes means for limiting current flow through said reset windings.

11. The improvement as defined in claim 1 including an auxiliary current boosting winding connected to and in series with said first secondary winding and a current control circuit means for connecting said auxiliary winding to one of said welding station elements with said current control circuit means including an unidirectional device poled in the same direction as said first pulse and a current limiting element in series with said unidirectional device.

12. The improvement as defined in claim 11 including a background inductor in series with said current control circuit of said current boosting winding.

13. The improvement as defined in claim 12 including a second auxiliary current boosting winding connected to and in series with said second secondary winding and a second current control circuit means for connecting said second auxiliary winding to said one station element at a position between said first mentioned control circuit and said background inductor.

14. The improvement as defined in claim 11 including a second auxiliary current boosting winding connected to and in series with said second winding and a second current control circuit means for connecting said second auxiliary winding to said one station element, said second current control circuit including a unidirectional device pole in the same direction as said unidirectional device of said first mentioned current control circuit.

15. The improvement as defined in claim 14 including a background inductor in series with said current control circuit of said current boosting winding.

16. The improvement as defined in claim 1 including a first auxiliary winding on said first core, a second auxiliary winding on said second core, means for connecting said auxiliary windings to a common junction and an energy storing means between said junction and one of said welding station elements to maintain a minimum welding current flow between said welding station elements in a given direction during operation of said power supply.

17. The improvement as defined in claim 16 wherein said energy storage means in an inductor.

18. The improvement as defined in claim 17 wherein said inductor has a value to maintain at least about 25 amperes of welding current flow.

19. In a high frequency power supply for supplying a welding current through a choke to a welding station including an electrode element and a workpiece element, said power supply including a transformer means for creating a first current pulse in a first secondary winding and a second current pulse in a second secondary winding and means for connecting said secondary windings to pass said current pulses through said choke and across said elements, the improvement comprising: a first auxiliary winding on said first core, a second auxiliary winding on said second core, means for connecting said auxiliary windings to a common junction and an energy storing means between said junction and one of said welding station elements to maintain a minimum welding current flow between said welding station elements in a given direction during operation of said power supply.

20. The improvement as defined in claim 19 wherein said energy storage means is an inductor.

21. The improvement as defined in claim 20 wherein said inductor has a value to maintain at least about 25 amperes of welding current flow.

22. In a high frequency power supply for supplying a welding current through a choke to a welding station including an electrode element and a workpiece element, said power supply including a transformer means for creating a first current pulse in a first secondary winding and a second current pulse in a second secondary winding and means for connecting said secondary windings to pass said current pulses through said choke and across said elements, the improvement comprising: an auxiliary winding on one of said cores, means for connecting said auxiliary winding to an energy storing means for maintaining a minimum welding current flow, said energy storing means between said auxiliary winding and one of said welding station elements to maintain said minimum welding current flow between said welding station elements in a given direction during operation of said power supply.

23. The improvement as defined in claim 22 wherein said energy storage means is an inductor.

24. The improvement as defined in claim 23 wherein said inductor has a value to maintain at least about 25 amperes of welding current flow.

25. In a high frequency power supply for supplying a welding current through a choke to a welding station including an electrode element and a workpiece element, said power supply including a transformer means for creating a first current pulse in a first secondary winding and a second current pulse in a second secondary winding and means for connecting said secondary windings to pass said current pulses through said choke and across said elements, the improvement comprising: said choke being the secondary of a high frequency starting transformer, said Dower supply employing high voltage pulses in an output circuit of said power supply for starting of an arc, and a unidirectional circuit means for concentrating said high voltage pulses used to start said arc in said output circuit of said power supply including a capacitor in series with said welding station elements and a current limiting inductor means between said secondary windings and said unidirectional circuit means to maintain current flow in said unidirectional circuit means during operation of said starting transformer.

26. The improvement as defined in claim 25 wherein said unidirectional circuit means includes a capacitor in series with a diode poled in the same direction as said weld station elements.

27. The improvement as defined in claim 25 including a resistive circuit in parallel with said unidirectional circuit means.

28. The improvement as defined in claim 25 including means for sensing current flow across said weld station elements and means for locating said unidirectional circuit means between said current sensing means and said weld station.

* * * * *